Feb. 14, 1967   V. L. STINAR   3,303,580
EDUCATIONAL AID
Filed Feb. 12, 1965   2 Sheets-Sheet 1

VIRGINIA L. STINAR
INVENTOR.
BY James D. Givnan
ATT'Y

Feb. 14, 1967 V. L. STINAR 3,303,580
EDUCATIONAL AID
Filed Feb. 12, 1965 2 Sheets-Sheet 2

VIRGINIA L. STINAR.
INVENTOR.

BY James D. Givnan
ATT'Y

United States Patent Office 3,303,580
Patented Feb. 14, 1967

3,303,580
EDUCATIONAL AID
Virginia L. Stinar, 3403 E. McLoughlin Blvd.,
Vancouver, Wash. 98661
Filed Feb. 12, 1965, Ser. No. 432,173
4 Claims. (Cl. 35—9)

This invention relates to improvements in educational aids and more particularly to a programmed manipulative device employing two tapes selectively, progressively and independently operable beneath sight openings in a housing; one tape having printed thereon symbols, signs, questions, pictorial illustrations and the like of interrogatory nature, and definitions, explanations and descriptions in the form of answers printed on the other tape.

The tapes may be programmed in a wide variety of information more immediately suited to a child's age and grade and at the same time provide a device which will enlist the maximum number of a child's instinctive and thought interests in the teaching of any subject matter that lends itself to memory drill exercises.

Another object is to provide a device of this character wherein the functional relation of the tapes is such that the selection of questions on one tape and what is believed to be the correct answer or response on the other are temporarily hidden from the view of the operator for subsequent checking by him or by his teacher.

A further object of the invention is the provision of a unitary carrier for both tapes and actuating rollers therefor which can be quickly and conveniently withdrawn from the housing and replaced by other programmed tapes.

A still further object is to provide a device of this character which is of simple, efficient, durable and inexpensive construction and well suited for the purpose intended.

The foregoing and other objects and advantages which will become subsequently apparent reside in the details of construction and operation as more fully hereinafter described and claimed, reference being had to the accompanying drawings forming a part hereof and in which:

Figure 4:
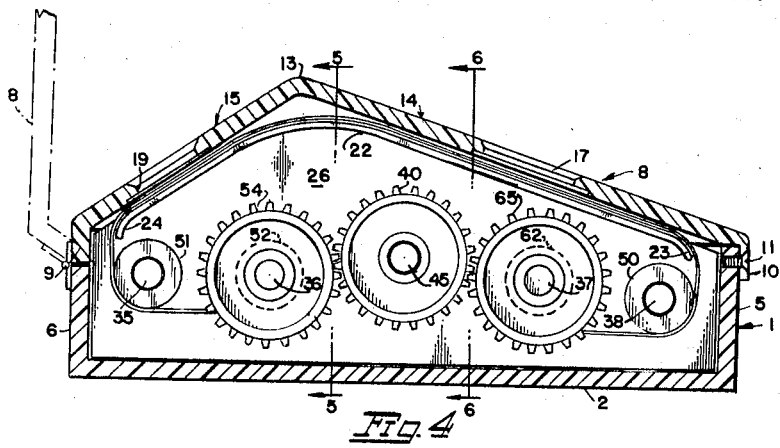
FIGURE 4 is a sectional side elevational view taken approximately along the line 4—4 of FIGURE 1.
Figure 5:
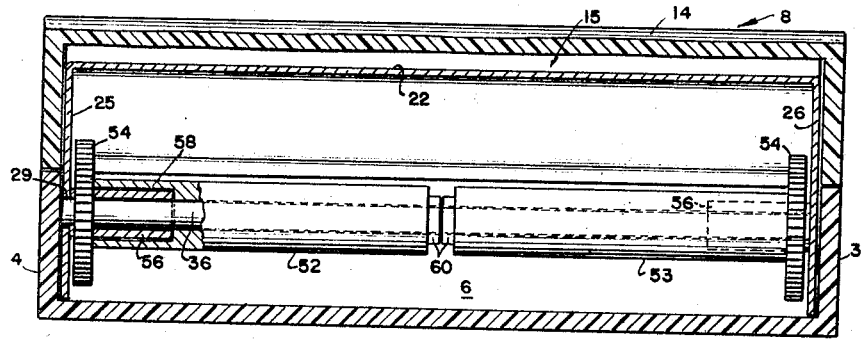
FIGURE 5 is a sectional end elevational view taken approximately along the line 5—5 of FIGURE 4 with fragments of internal parts broken away and in section for convenience of illustration.
Figure 6:
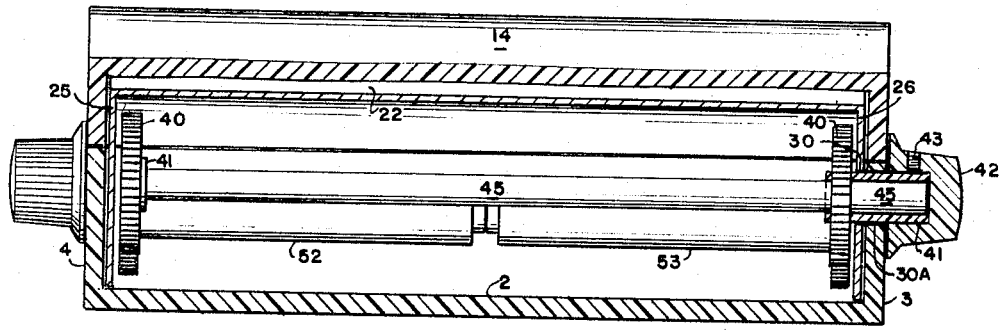
FIGURE 6 is a similar view taken along the line 6—6 of FIGURE 4.

With continuing reference to the drawings wherein like reference characters designate like parts, and particularly FIGURES 4–6 thereof, reference numeral 1 indicates generally a box-like casing comprising a bottom wall 2, side walls 3 and 4 and front and rear walls 5 and 6 respectively. A closure 8 for the casing is hinged, preferably by a piano hinge 9, to the rear wall 6 and provided at its forward end with a flange 10 adapted for securement to the front wall 5 by any suitable fastening means indicated generally at 11.

The closure is divided by a ridge 13 into a forward portion 14 of greater length and formed on a lesser angle of inclination than that of its rearward portion 15. The forward portion (see also FIG. 1) is provided with two laterally spaced sight openings 17 and 18 and the rearward portion is provided with two similar openings 19 and 20 outwardly offset from the openings 17–18 and directly over symbols and indicia on the printed tapes shown in FIGURES 2 and 3, as will be more fully hereinafter described.

Figure 7:
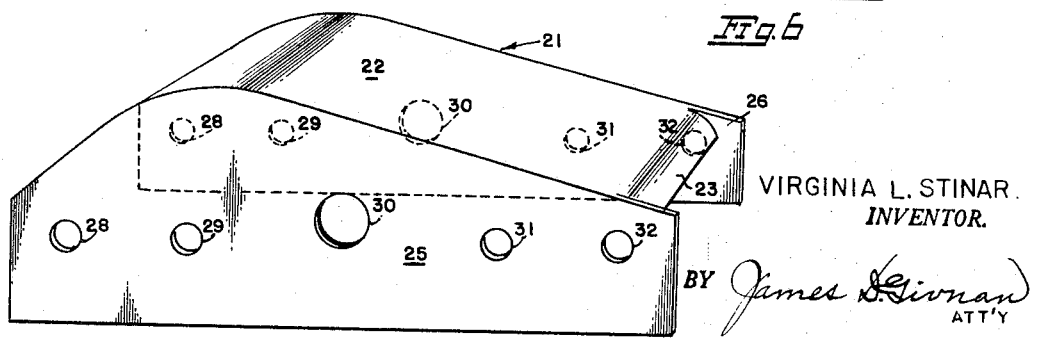
FIGURE 7 is a perspective detail view of a carrying frame for spindles, tape rollers and actuating gears therefor.

The roller frame 21, illustrated in FIGURE 7, is made of sheet metal and may be produced by a punch and forming die to provide a smooth somewhat arcuate top surface 22 substantially matching the underside of the front and rear portions of the top cover 8 and curved downwardly as at 23 and 24 at its forward and rearward ends respectively. Side walls 25–26 of the frame have transversely aligned openings 28, 29, 30, 31 and 32 therein to provide bearings for rotatable parts within the casing.

As best illustrated in FIGURE 4, spindles 35, 36, 37 38 are rotatably mounted respectively in the aligned openings 28, 29, 31 and 32 in the side walls 25–26 of the roller frame 21.

Each of the aligned openings 30 in frame 21 and matching openings 30A in the side walls 3 and 4 of casing 1, rotatably support a driving gear 40 by its hollow hub 41 rotatable by means of a turning knob 42 secured to the hub as at 43. The gears 40 are rotatable independently about their supporting shaft 45. The spindles 35 and 38 rotatably support forward and rearward idling guide rollers 50–51 respectively. The spindle 36, rotatable in the aligned openings 29 of the roller frame 21, supports independently rotatable rollers 52–53 each provided at its outer end with a driven gear 54 provided with a hub 56 secured to its respective roller by a forced fit into the inwardly bored end 58 thereof, or it may be pinned thereto if desired. The rollers, hubs and gears are freely rotatable about their respective shafts which may be rotatable within or fixedly secured to the side walls 25–26 of the roller frame. The abutting inner ends of the rollers 52–53 are reduced in diameter as at 60 to reduce rotational friction.

The spindle 37 is provided with similar tape rollers 62 rotatable by gears 65 driven by the driving gears 40 in the same manner as the gears 54 of the first mentioned rollers 52–53.

It is to be noted that all of the gears just described are identical and can be made of plastic and thus advantageously produced by a single mold and that the rollers are all of the same inside and outside diameter and can be made of identical pieces cut from a length of tubing of uniform inside and outside diameters. The spindles 35–38 and the shaft 45 are also made from a length of steel rod of uniform diameter throughout its length.

The insert frame including its related parts is unique in that it provides a unitary means for compactly operatively inserting each individual lesson or program into the machine without the necessity of changing the rollers, spindles, gears, etc., for a changeover from one course or program to another.

As previously stated, the ends of the spindles 35, 36, 37 and 38 are freely rotatable within the aligned openings 28, 29, 31 and 32 of the insert frame 21 and are held in place by the side walls 3 and 4 of the casing 1 when the insert frame 21 is reposing within the casing but the spindles can be easily removed from either side of the insert frame through their respective openings in the frame when the same is lifted upwardly from the casing 1.

Figure 2:
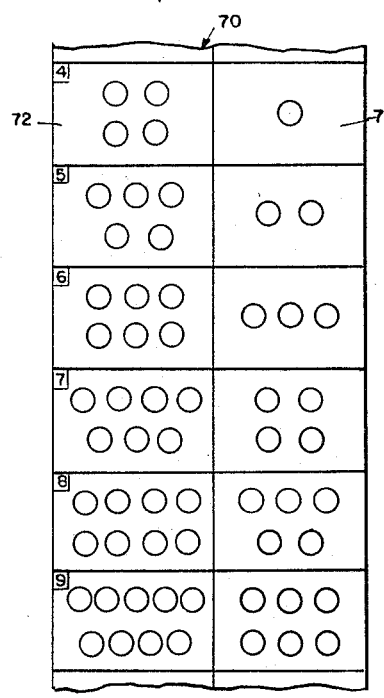
FIGURES 2 and 3 are fragmentary views of typical tapes bearing symbols, questions and descriptions, numerical indicia, and correctly corresponding answers.
Figure 3:
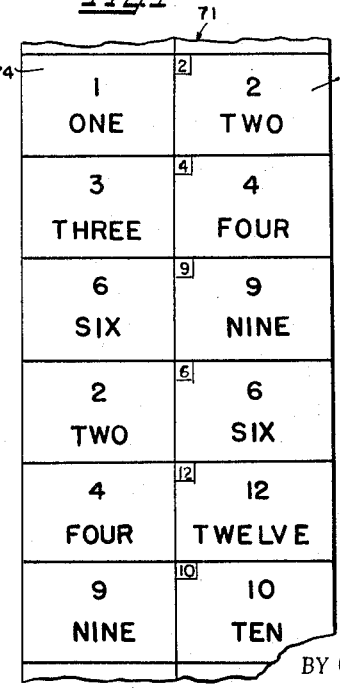
Figure 3A:
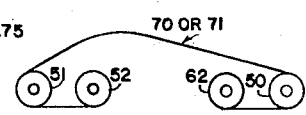
FIGURES 3A and 3B are diagrammatic views illustrating respectively that the tapes herein shown and described may be payed out from one roller and rolled up on another, or they may be endless for continuous rotation about two rollers.
Figure 3B:

With particular reference to FIGURES 2 and 3, the tapes 70 and 71 may be referred to respectively as question and response or answer tapes. Tape 70 has printed thereon two boxed columns 72–73 containing various groups of symbols, and tape 71 has printed thereon numerals in digital and written form arranged in two boxed columns 74–75. Tape 70 is payed out from its respective roller 62, over idling roller 50, arcuate platform 22, rearward idling roller 51 and finally wound up on roller 52. During such movement of the tape 70 in either direction, the symbols in column 73 thereof will appear progressively through the forward sight opening 17 in the closure 8 while those in column 72 will become visible through the rearward sight opening 19.

During similar movement of tape 71, the indicia in column 74 will be visible through the other forward sight opening 18 while those in column 75 will appear through the rearward sight opening 20, all in accordance with the amount of rotation imparted to the rollers by the turning knobs 42.

In operating the device, a child rotates the left hand knob 42 to bring into registry with the forward left hand sight opening 17, the box he selects, for example, the one with the four circles fourth down from the top of column 73 on tape 70. He then, with his right hand, rotates the right hand knob 42 to bring into registry with the right hand front sight opening 18 what he believes to be the correct response or answer appearing in column 74 of the answer tape 71.

Figure 1:
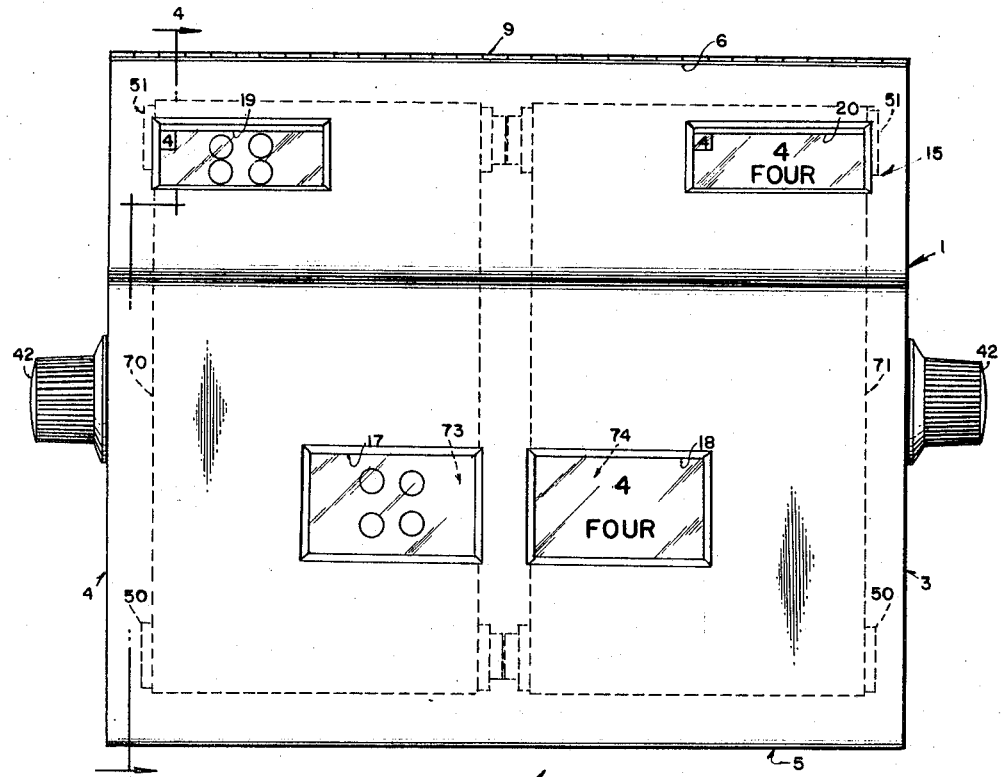
FIGURE 1 is a top plan view of an educational device made in accordance with my invention.

FIGURE 1 illustrates the fact that the correct answer (visible through sight opening 18) has been selected and is also visible through the right hand rear sight opening 20. It will then be instantly apparent to a teacher or supervisor standing at the rear of the casing 1 that the child has answered correctly the question he selected on tape 70. Then, by walking to the rear of the box himself or turning the box around, the child will become aware of either the correctness or incorrectness of the answer to the problem he selected.

It is to be understood that the printed symbols and indicia herein shown and described do not necessarily prescribe any limits of utility since obviously questions and problems of many different kinds could appear on one tape and the responses and/or answers on the other, and that the relative spacing of the symbols and that of the corresponding indicia can be varied to any desired extent.

It is also to be understood that the roller frame 21 may be dispensed with by journaling the ends of spindles 35, 36, 37, 38 and driving shaft 45 in upwardly opening slots (not shown) in the side walls 3 and 4 of the casing 1 and so held in proper working relation to each other and when necessary or desirable may be removed progressively or selectively from the interior of the casing. A further modification, in the absence of the roller frame 21, comprehends the replacement of the gear shaft by, or the mounting thereon, rollers of sufficient diameter cooperating with the rollers 52–53 and 62 enlarged to a matching diameter to carry the tapes along a path below the front and rear sight openings 17–18 and 19–20, respectively, for visibility thereto.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. An educational device comprising in combination;
   a casing having a bottom wall, side walls, front and rear walls and a top closure,
   said closure comprising a front and a rear portion sloping upwardly from said front and rear walls respectively in a manner that when the front portion is viewed from a normal operating position, the rear portion is hidden, and having a first pair of laterally spaced openings in said rear portion, and a second pair of laterally spaced openings in said front portion offset laterally from said first pair of openings,
   two independently rotatable driving gears mounted within said casing one each through each of said side walls and rotatable from the exterior thereof,
   at least one pair of rollers rotatably mounted within the casing forwardly of said driving gears,
   at least one pair of rollers similarly mounted rearwardly of said driving gears and having a driving connection therewith,
   tapes entrained over said rollers and having printed numbers and symbols thereon readable progressively through said sight openings as the tapes are moved by said rollers from one to the other.

2. An educational device as claimed in claim 1 wherein said symbols on one of said tapes are visible through two of said sight openings, and the numbers on the other of said tapes are visible through the other two of said sight openings.

3. An educational device comprising in combination;
   a casing having a bottom wall, side walls, front and rear walls and a closure,
   said closure comprising a front and a rear portion sloping upwardly from said front and rear walls respectively in a manner that when the front portion is viewed from a normal operating position, the rear portion is hidden, and having a first pair of laterally spaced openings in said rear portion, and a second pair of laterally spaced openings in said front portion offset laterally from said first pair of openings.
   a frame having side walls substantially coextensive in length with said side walls of the casing and a top wall subjacent said closure and providing a sliding support for tapes,
   a pair of independently mounted driving gears rotatably mounted one each within the side walls of said frame and rotatable from the exterior of the casing,
   two pairs of independently rotatable rollers disposed one pair each forwardly and rearwardly of said driving gears and having a driving connection therewith,
   tapes payable from the rollers of one pair to the corresponding rollers of the other pair over said top wall of said frame and supported thereby for visibility through said sight openings in said closure, and
   one of said tapes having printed symbols thereon and the other tape having thereon numerals in digital and written form.

4. An educational device comprising in combination;
   a casing having a bottom wall, side walls, front and rear walls and a closure,
   means hingedly attaching the closure to said casing,
   said closure comprising a front and a rear portion sloping upwardly from said front and rear walls respectively in a manner that when the front portion is viewed from a normal operating position, the rear portion is hidden, and having a first pair of laterally spaced openings in said rear portion, and a second pair of laterally spaced openings in said front portion offset laterally from said first pair of openings,
   a frame having side walls substantially coextensive in length with said side walls of the casing and a top wall subjacent said closure and providing a sliding support for tapes,
   a pair of independently mounted driving gears rotatably mounted one each within the side walls of said frame and rotatable from the exterior of the casing, two pairs of independently rotatable guide rollers disposed one pair each at the forward and rearward end of said frame, two pairs of independently rotatable wind-up rollers disposed one pair each forwardly and rearwardly of said guide rollers and having a driving connection with said driving gears, tapes payable from the wind-up rollers of one pair over one pair of said guide rollers, over said top wall of said frame for visibility through said sight openings and over the other pair of said guide rollers and onto said other pair of wind-up rollers.

References Cited by the Examiner

UNITED STATES PATENTS 1,230,997  6/1917  Clise _____ 281—9

FOREIGN PATENTS 486,337  6/1938  Great Britain.

JEROME SCHNALL, *Primary Examiner.*

R. E. KLEIN, *Assistant Examiner.*